United States Patent [19]

Westall

[11] Patent Number: 5,256,755

[45] Date of Patent: Oct. 26, 1993

[54] PROCESS FOR THE PRODUCTION OF ORGANOSILICON COMPOUNDS

[75] Inventor: Stephen Westall, Barry, Wales

[73] Assignee: Dow Corning Limited, Barry, Wales

[21] Appl. No.: 923,640

[22] Filed: Aug. 3, 1992

Related U.S. Application Data

[63] Continuation of Ser. No. 715,284, Jun. 14, 1991, abandoned.

Foreign Application Priority Data

Jun. 28, 1990 [GB] United Kingdom ............... 9014450

[51] Int. Cl.$^5$ .............................................. C08G 77/06
[52] U.S. Cl. .......................................... 528/14; 528/33
[58] Field of Search .................................... 528/14, 33

[56] References Cited

U.S. PATENT DOCUMENTS

| | | | |
|---|---|---|---|
| 3,433,764 | 3/1969 | Walmsley | 260/46.5 |
| 4,356,293 | 10/1982 | Deubzer | 525/477 |
| 4,704,443 | 11/1987 | Lamont | 528/18 |
| 5,026,811 | 6/1991 | Kookootsedes | 528/14 |

FOREIGN PATENT DOCUMENTS 0382366 8/1990 European Pat. Off.

*Primary Examiner*—Melvyn I. Marquis
*Attorney, Agent, or Firm*—Sharon K. Severance

[57] ABSTRACT

Process for the production of organosiloxanes comprising contacting (A) at least one organosilicon compound having in the molecule at least one silanol group, the organic substituents being selected from monovalent hydrocarbon groups having from 1 to 14 carbon atoms and monovalent substituted hydrocarbon groups having from 1 to 10 carbon atoms, with (B) one or more compounds selected from rubidium carbonate, cesium carbonate and carboxylates of rubidium and cesium.

6 Claims, No Drawings

PROCESS FOR THE PRODUCTION OF ORGANOSILICON COMPOUNDS

This is a continuation Ser. No. 07/715,284 filed Jun. 14, 1991, now abandoned.

This invention relates to the production of organosiloxanes and relates in particular to a process for the condensation of organosilicon compounds having silicon-bonded hydroxyl groups.

The production of organosiloxane polymers by the polymerisation or copolymerisation of relatively low molecular weight organosiloxanes is a well known step in the manufacture of commercial silicones. Generally the polymerisation or copolymerisation is carried out by contacting cyclic organosiloxanes or low molecular weight silanols, or mixtures thereof, with an acidic or a basic catalyst. Many substances which may be employed as catalysts have been described in the literature and include sulphuric acid, hydrochloric acid, Lewis acids, sodium hydroxide, potassium hydroxide, tetramethylammonium hydroxide, tetrabutylphosphonium silanolate, amines and others. However, although such catalysts are effective in producing the desired increase in molecular weight of the starting materials, they have the disadvantage of causing scission and rearrangement of the siloxane bonds. As a result of such rearrangement the product often contains a significant proportion of low molecular weight siloxanes. For many applications, for example in the fabrication of silicone elastomers, it is necessary to remove such low molecular weight materials by devolatilisation in order to obtain a satisfactory product. Rearrangement of the siloxane bonds is also undesirable when the polymer is to contain a planned distribution of two or more types of organic substituents, for example in the production of a polydimethylsiloxane containing a proportion of organofunctional, e.g. aminoalkyl, substituents.

Catalysts for promoting ≡SiOH + ≡SiOH and ≡SiOH + SiOR, R = organic, without siloxane bond cleavage have been disclosed in G.B. 895 091 and 918 823 and include for example tetramethylguanidine 2-ethylcaproate and n-hexylamine 2-ethylcaproate. However, many of such catalysts are liquids, or are not suitable for use at high temperatures, or are not readily removable from the product. There has, therefore, been a continuing search for substances which would be effective as catalysts for the production of condensation products of organosiloxanols but which would not cause molecular rearrangement and the consequent presence of significant amounts of low molecular weight species in the product. In particular the desired catalysts should preferably be suitable for use in heterogeneous systems and remain active during use, thereby enabling their recovery and re-use in batch processes or their application in a continuous process.

We have now found that carbonates and certain carboxylates of rubidium and caesium have the ability to catalyse the condensation of organosilicon compounds. We have further found that said rubidium and caesium compounds can advantageously be employed in the production of organosilicon polymers having a relatively low content of low molecular weight species.

Accordingly, the present invention provides a process for the production of organosiloxanes which comprises contacting (A) at least one organosilicon compound having in the molecule at least one silanol group and wherein the silicon-bonded organic substituents are selected from monovalent hydrocabon groups having from 1 to 14 carbon atoms and monovalent substituted hydrocarbon groups having from 1 to 10 carbon atoms, the said substituted hydrocarbon groups being non-acidic in character, and (B) one or more compounds selected from rubidium carbonate, caesium carbonate and carboxylates of rubidium and caesium of the general formula Q.CO.OM, wherein M represents Rb or Cs and Q represents an alkyl group having from 1 to 6 carbon atoms or an alkenyl group having from 2 to 5 carbon atoms.

The process of this invention may be applied in the production of condensation products of any type of organosilicon compound having at least one silanol, that is ≡SiOH, group in the molecule. Thus, the organosilicon compound may be an organosilane, organosiloxane or a silcarbane or mixtures of the same type or of different types of such organosilicon compounds. The silicon-bonded organic substituents in the organosilicon compound may be monovalent hydrocarbon groups having from 1 to 14 inclusive carbon atoms, for example alkyl, aryl, aralkyl, alkaryl or alkenyl groups, or they may be monovalent substituted hydrocarbon groups having up to 10 carbon atoms and which are non-acidic in character, that is groups not containing acidic substituents such as carboxyl, sulphate and sulphonic. Examples of operative non-acidic groups are amino-substituted alkyl and aryl groups, mercaptoalkyl groups, haloalkyl groups, cyanoalkyl groups and hydroxy alkyl groups. Specific examples of the organic substi tuent which may be present in the organosilicon compounds employed in the process of this invention are methyl, ethyl, propyl, hexyl, dodecyl, tetradecyl, phenyl, xylyl, tolyl, phenylethyl, vinyl, allyl, hexenyl, $-RNH_2$, $-RNHCH_2CH_2NH_2$, $-RSH$, $-RBr$, $-RCl$ and $-ROH$ wherein R represents a divalent organic group, preferably having less than 8 carbon atoms for example alkylene e.g. $-(CH_2)_3-$ and $-CH_2CHCH_3CH_2-$, arylene e.g. $-C_6H_4-$ or aralkylene e.g. $-(C_6H_3.CH_3)-$. For the majority of commercial applications at least 50% of the total organic substituents in (A) will be methyl groups any remaining substituents being selected from phenyl and vinyl groups.

Although applicable to any type of organosilicon compound having at least one silanol group the process of this invention is particularly useful for the production of higher molecular weight organosiloxane polymers from lower molecular weight hydroxylated species. For example, during the production of organosiloxanes by the hydrolysis of the corresponding organochlorosilanes there is obtained a mixture of low molecular weight organosiloxanes having two or more silanol groups per molecule. The process of this invention may be employed to increase the molecular weight of such organosiloxanes where the production of high proportions of volatile siloxanes may be undesirable. According to a preferred embodiment of this invention the organosilicon compounds (A) are silanol-terminated polydiorganosiloxanes, that is substantially linear organosiloxane polymers or oligomers having a hydroxyl group attached to each terminal silicon atom. Such polydiorganosiloxanes include those which can be represented by the average general formula

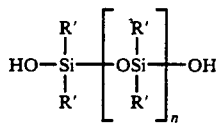

wherein each R' represents the hereinabove defined organic substituents and n is an integer, preferably from 1 to about 100. As hereinbefore stated, commercially the R' substituents are normally predominantly methyl with any remaining R' substituents being selected from vinyl and phenyl.

If desired the condensation products may be end-stopped with triorganosiloxy units. One method of effecting such end-stopping comprises incorporating in the reaction mixture a trioganosilane, for example a triorganoalkoxysilane, which is reactive with the condensation product. Such a reaction may be effected in the presence of a suitable catalyst, for example barium or strontium hydroxide as described in our copending European application 90300645.0 (reference MS-P 494). However, a more preferred method of producing end-stopped polydiorganosiloxanes employing the process of this invention comprises employing as the organosilicon compound (A) both (i) at least one polydiorganosiloxane having a hydroxyl group attached to each terminal silicon atom, and (ii) a polydiorganosiloxane terminated with a hydroxyl group at one end and a trioganosiloxy group at the other.

The catalyst substance (B) is a carbonate or carboxylate of rubidium or caesium. In the general formula of the carboxylates Q may be for example methyl, ethyl, propyl, hexyl, vinyl or allyl. Specific examples of catalyst (B) are rubidium carbonate, caesium carbonate, rubidium acetate, caesium propionate, caesium butyrate and rubidium acrylate. The particle size of the catalyst substance is not critical. Generally, the smaller the particles the greater is the catalytic surface available. However, very fine particle size powders may be more difficult to remove from the condensation product.

The process of this invention involves contacting the organosilicon compound (A) with the catalyst (B) at a temperature at which the desired rate of molecular weight increase occurs. The temperatures employed may vary within wide limits for example from about 30° C. to about 200° C. Reaction at the lower temperatures is, however, normally too slow for commercial purposes and the process is preferably carried out at temperatures within the range from about 70° C. to 15° C. It is also preferred to accelerate the removal of water formed during the condensation reaction by carrying out the process under reduced pressure, that is, at a pressure less than normal atmospheric and most preferably less than about 0.5 bar ($0.5 \times 10^5$ Pa). One method of carrying out the process is by means of a batch procedure. For example, the catalyst may be dispersed in the organosilicon compound and the mixture raised to the required temperature. Alternatively, the organosilicon compound may be preheated prior to the addition of the catalyst. Advantageously the mixture is agitated during the reaction period to maintain the catalyst in suspension. Sufficient catalyst is employed to achieve the desired rate of condensation having regard to the nature and geometry of the processing equipment, temperature and other factors. From considerations of speed of reaction and economy of operation we prefer to employ from about 0.001 to about 5% by weight of the catalyst based on the weight of the organosilicon compound. Termination of the condensation reaction, if desired, may be achieved for example by lowering the temperature of the mixture, and/or raising the reaction pressure to atmospheric and/or by separation or neutralisation of the catalyst.

Because of their heterogeneous nature the catalysts (B) are particularly adapted for use in processes involving manufacture on a continuous, rather than a batch, basis. Properly employed such so-called 'continuous processes' avoid the delays and costs common to batch processing, for example those involved in the charging and discharging of the reaction vessel and separation of the catalyst material from the product. Thus, for example, the process of this invention may be advantageously employed for the continuous production of higher molecular weight siloxane polymers from lower molecular weight hydroxyl-containing species. When carrying out the process of this invention in a continuous mode contact between the catalyst material and the organosilicon compound may be achieved by passing the organosilicon compound over or through a bed containing the catalyst material. When employing viscous reactants or products it may be necessary to adjust the porosity of the bed by granulation of the catalyst or other means. We have found that a particularly suitable form of bed for continuous operation can be obtained by depositing the catalyst substance in or on a particulate solid material, for example silica, which is substantially inert under the process conditions and which has a particle size appropriate to the desired porosity of the bed.

The condensation products produced by the process of this invention may be employed in any of the variety of applications known for the corresponding products made by prior art procedures. For example they may be used for treating textiles to render them water repellent and impart softness, as components of paper coating compositions, as heat transfer liquids and in the production of adhesives and sealing materials.

The following Examples illustrate the invention.

EXAMPLE 1

2 g of rubidium carbonate $Rb_2CO_3$ was added to 100 g of a linear α,w silanol terminated polydimethylsiloxane having an average molecular weight of 3,300 and silanol content of 1.1% by weight (as OH). The mixture was agitated and heated to 100° C. at a pressure of 100 mm.Hg (13.3 kPa). After two hours the mixture was cooled and filtered. The filtrate was a siloxane polymer having an average molecular weight of 53,800 and silanol content 0.064% by weight (as OH). The non-volatile content of the product polymer (measured by weight loss in a forced draught oven at 150° C. for 3 hours on a 1 g sample) was 98.6% by weight. The starting polymer had a corresponding non-volatile content of 97.5% indicating that no additional volatile cyclosiloxanes were formed during the polymerisation process.

EXAMPLE 2

The procedure of Example 1 was followed but substituting caesium carbonate $Cs_2CO_3.2H_2O$ for the rubidium salt. All other conditions were identical. The product polymer had an average molecular weight of 96,300, a silanol content of 0.035% by weight (as OH) and a non-volatile content of 98.5% by weight.

EXAMPLE 3

The procedure of Example 1 was repeated except that rubidium acetate

and cesium acetate

respectively were substituted for the rubidium carbonate. The results were as follows:

| | Starting Polymer | | Product Polymer | | |
|---|---|---|---|---|---|
| | Mn | SiOH % w/w | Mn | SiOH % w/w | Non-Volatile Content |
| RbOAc | 3,300 | 1.1 | 10,330 | 0.32 | 98.2 |
| CsOAc | 3,300 | 1.1 | 26,030 | 0.13 | 98.3 |

EXAMPLE 4

250 ml of Harshaw Al-O104T neutral alumina, 3 mm pellets were slurried overnight with a solution of 150 g of $Cs_2CO_3$ in 100 ml of distilled water. The saturated pellets were drained and oven-dried to constant weight. The pellets had a calculated $Cs_2CO_3$ content of 25.6% by weight.

A 100×2.5 cm ID glass column was packed along its total length with the treated pellets and fixed vertically. The column was wrapped with electrical heating tape and heated to a temperature of 130° C. A product receiving flask was fitted to the bottom of the column and the system was evacuated to 50 mm Hg (6.67 kPa) pressure. A polydimethylsiloxane of average molecular weight 3,300 was heated to 120° to 130° C. and fed into the upper opening of the glass column at a rate sufficient to allow the feed to trickle over the packing without flooding. A countercurrent dry nitrogen flow of 0.5 cu ft/hour was also employed to aid in the removal of water formed by condensation. After one pass through the column the viscosity of the polydimethylsiloxane had increased and the silanol content had fallen as follows:

| Sample | Total OH ppm | $H_2O$ ppm | SiOH ppm | Viscosity cS at 25° C. |
|---|---|---|---|---|
| Feedstock | 15100 | 1181 | 13919 | 87.0 |
| Product | 6700 | 103 | 6597 | 1700.0 |

Gpc analysis of the polymer product showed no evidence of siloxane bond rearrangement, e.g. the presence of dimethyl cyclics.

EXAMPLE 5

1 g of caesium carbonate was added to 200 g of a linear methylvinylpolysiloxane fluid with terminal silanol functionality

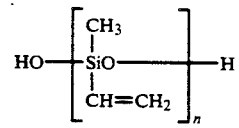

having a viscosity at 25° C. of 54.7 cS (54.7×10$^{-6}$ m$^2$/s). The mixture was heated to 100° C. under a reduced pressure of 40 mbar (4×10$^3$ Pa) with constant agitation. After 2 hours the mixture was cooled. The cooled product had a viscosity of 156,667 cS (157×10$^{-3}$ m$^2$/s) 25° C.

When the experiment was repeated using 1 g of caesium acetate in place of the carbonate and identical reaction conditions, the viscosity of the methylvinylsiloxane fluid increased from 54.7 cS at 25° C. to 24,343 cS (24.3×10$^{-3}$ m$^2$/s).

That which is claimed is:

1. A process for the production of organosiloxanes which comprises reacting at a temperature from about 30° C. to 200° C.
   (A) at least one organosilicon compound having in the molecule at least one silanol group and wherein the silicon-bonded organic substituents are selected from the group consisting of monovalent hydrocarbon groups having 1 to 14 carbon atoms and monovalent substituted hydrocarbon groups having from 1 to 10 carbon atoms, said substituted hydrocarbon groups being non-acidic in character, by contacting said organosilicon compound with
   (B) one or more compounds selected from the group consisting of rubidium carbonate, cesium carbonate, and carboxylates of rubidium and cesium of the general formula Q.CO.OM, which are present dispersed on or in a particulate solid which is substantially inert under the reaction conditions; wherein M represents Rb or Cs and Q represents an alkyl group having from 1 to 6 carbon atoms or an alkenyl group having from 2 to 5 carbon atoms; and thereafter separating the resulting organosiloxane from catalyst (B) and recovering said organosiloxane.

2. A process as claimed in claim 1 wherein (A) and (B) are contacted at a temperature within the range from 70° C. to 150° C.

3. A process as claimed in claim 1 wherein (A) and (B) are contacted under a pressure of less than 0.5×10$^5$ Pa.

4. A process as claimed in claim 1 wherein (B) is employed in a proportion of from 0.001 to 5% by weight based on the weight of the organosilicon compound (A).

5. A process as claimed in claim 1 wherein organosilicon compound (A) comprises both (i) at least one polydiorganosiloxane having a hydroxyl group attached to each terminal silicon atom, and (ii) a polydiorganosiloxane terminated with a hydroxyl group at one end and a triorganosiloxy group at the other.

6. A process as claimed in claim 1 wherein (A) is passed through a bed containing (B).

* * * * *